United States Patent [19]

Cardoza

[11] 4,051,597
[45] Oct. 4, 1977

[54] SAW GUIDE DEVICE

[76] Inventor: Louis Cardoza, P.O. Box 488, Brookings, Oreg. 97415

[21] Appl. No.: 717,033

[22] Filed: Aug. 24, 1976

[51] Int. Cl.² .............................................. B27B 11/02
[52] U.S. Cl. ...................................................... 30/373
[58] Field of Search ................. 30/373, 374, 375, 392, 30/169, 290, 289, 296 R

[56] References Cited

U.S. PATENT DOCUMENTS

| 2,377,673 | 6/1945 | Chaddock | 30/373 |
| 2,819,742 | 1/1958 | Blachly | 30/373 |
| 2,951,286 | 9/1960 | Mann | 30/169 |
| 3,456,698 | 7/1969 | Csaki | 30/373 |

Primary Examiner—Jimmy C. Peters
Attorney, Agent, or Firm—Allen D. Brufsky

[57] ABSTRACT

A saw guide device includes a planar element having a pair of sides, a forward end, and a rear end. A flange member is affixed at an obtuse angle to the forward end of the planar element. An L-shaped member is affixed to each side of the planar element, wherein each L-shaped element is tilted inwardly over the planar element. The shoe of the saw is adapted to be received on the planar element. A block element is affixed to a bottom rear center of the planar element, wherein the block element is received into the saw cut rearwardly of the saw blade.

3 Claims, 3 Drawing Figures

SAW GUIDE DEVICE

BACKGROUND OF THE INVENTION

In using a saber saw, the user commonly experiences difficulty in making a straight line cut. The present guide device enables the user to easily make a straight line saw cut. The guide devices of U.S. Pat. Nos. 3,390,461 to Anderson and 3,504,716 to Bush are non-applicable to my present invention.

SUMMARY OF THE INVENTION

My present invention relates to a unique and novel saw guide device for producing a straight line cut with a sabar saw.

An object of my present invention is to provide a saw guide device of simple design which is readily adaptable to already existing saber saws, wherein the device helps produce a straight line cut.

Briefly my present invention comprises a planar element having a pair of sides, a forward end, and a rear end. A flange member is affixed at an obtuse angle to the forward end of the planar element. An L-shaped member is affixed to each side of the planar element, wherein each L-shaped element is tilted inwardly over the planar element. The shoe of the saw is adapted to be received on the planar element. A block element is affixed to a bottom rear center of the planar element, wherein the block element is adapted to be received in the saw cut in the board rearwardly of the saw blade.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
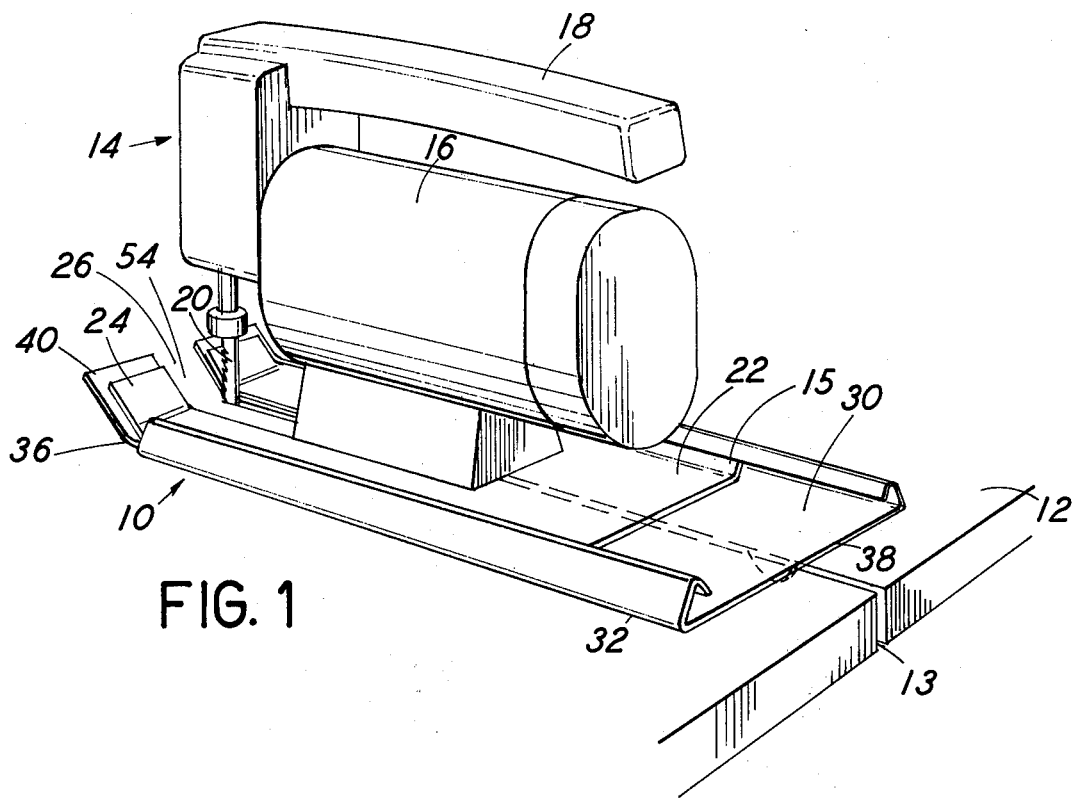
FIG. 1 illustrates a perspective view of a saw guide for a saber saw.

Turning now descriptively to the drawings, in which similar reference characters denote similar elements throughout the several views, FIG. 1 shows a saw guide 10 used to promote a straight line cut, when cutting a board 12 such as a panel with a saber saw 14 having a motor housing 16, a handle 18, a conventional type vertically aligned reciprocating saw blade 20, and a supporting shoe 22. The shoe 22 is formed from a rectangularly shaped center plate 22 with one end 24 of plate 22 is turned upwardly at an obtuse angle, wherein a longitudinally aligned elongated channel 26 extends inwardly from end 24 to the motor housing 16. A side flange 15 extends obtusively upwardly from each side of plate 22.

Figure 2:
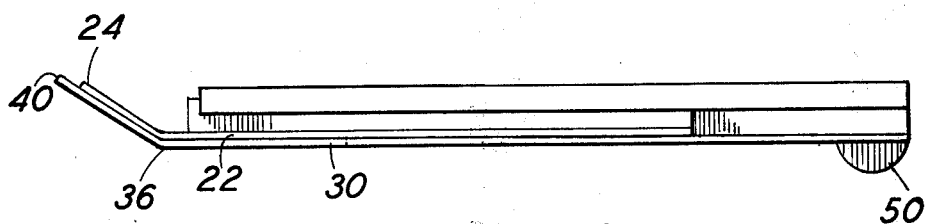
FIG. 2 illustrates a side view of the device.
Figure 3:
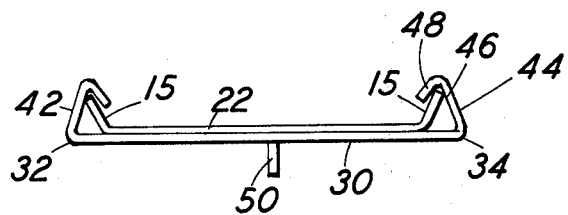
FIG. 3 illustrates an end view of the device.

The guide 10 as shown in FIGS. 1-3 comprises a rectangularly shaped planar element 30 having a pair of sides 32, 34, a forward end 36, and a rear end 38. A front flange member 40 is integrally joined to end 36, wherein flange member 40 extends upwardly and outwardly at an obtuse angle from element 30. To each side 32, 34 of element 30 is integrally joined an L-shaped member 42, 44. Each L-shaped member 42, 44 has a long 46 and a short 48 leg. The lower end of the long leg 46 of each member 42, 44 is affixed at an acute angle to one of the sides 32, 34 such that each member 42, 44 extends slightly inwardly over element 30 and the shorter leg 48 of each member 42, 44 extends dowardly towards the upper surface of element 30. A block member 50 is affixed perpendicularly to a bottom rearsurface of element 30. The flange member 40 and planar element 30 have a rectangularly shaped opening 54 therethrough, wherein opening 54 extends longitudinally inwardly from the outer edge of flange member 40 such that channel 26 and opening 54 are aligned.

In use, the shoe 22 slides into and on top of the guide 10 such that channel 26 and opening 54 are aligned and side flanges 15 are disposed between the legs 46, 48 of each member 42, 44. The saw blade makes the kerf cut 13 in board 12 and block member 50 enters and follows the saw blade 20 in the kerf 13 thereby keep guide 10 aligned in a straight line.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A saw guide used for producing a straight line kerf cut in a board with a saw having a saw blade, a motor housing, a handle, and a shoe, said shoe having upwardly extending side flanges and an upwardly bent forward end, which comprises:
    a. a rectangularly shaped planar element having a pair of sides, a forward end, and rear end, said planar element adapted to receive said shoe thereon;
    b. means for retaining said shoe on said planar element, said retaining means including an L-shaped member affixed to each said side of said planar member, each said L-shaped member tilted inwardly over said planar element, each said L-shaped member adapted to slidably receive a corrsponding said side flange provided by each side of said shoe for retaining said planar member upon said shoe;
    c. means for extending said saw blade through said forward end of said planar element; and
    d. a block element affixed perpendicularly to a bottom rear center surface of said planar element, said block element adapted to be received in said kerf cut rearwardly of said saw blade.

2. A guide according to claim 1, further comprising a flange member extending upwardly and forwardly from said forward end of said planar element.

3. A guide according to claim 2, wherein said extending means includes said planar element and said flange member having a longitudinally aligned opening therethrough, said opening extending inwardly from an outer edge of said flange member.

* * * * *